US006937544B2

(12) United States Patent
Takehara et al.

(10) Patent No.: US 6,937,544 B2
(45) Date of Patent: Aug. 30, 2005

(54) OPTICAL DISK UNIT FOR RECORDING OR REPRODUCING INFORMATION

(75) Inventors: Shintaro Takehara, Yokohama (JP); Katsuo Iwata, Tokyo (JP); Maho Kuwahara, Tokyo (JP); Sumitaka Maruyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 582 days.

(21) Appl. No.: 10/100,170

(22) Filed: Mar. 19, 2002

(65) Prior Publication Data

US 2003/0063530 A1 Apr. 3, 2003

(30) Foreign Application Priority Data

Sep. 28, 2001 (JP) ........................................ 2001-304571

(51) Int. Cl.[7] ............................................... G11B 7/00
(52) U.S. Cl. ................ 369/44.27; 369/47.5; 369/53.23; 369/112.23
(58) Field of Search ........................... 369/44.23, 44.26, 369/44.27, 44.28, 44.29, 44.32, 44.35, 47.36, 47.38, 47.39, 47.4, 47.44, 47.5, 47.55, 53.12, 53.13, 53.14, 53.26, 112.23, 112.24, 53.23, 53.28

(56) References Cited

U.S. PATENT DOCUMENTS

| | | |
|---|---|---|
| 6,172,957 B1 | 1/2001 | Ogasawara |
| 6,381,208 B1 | 4/2002 | Abe et al. |
| 6,771,584 B2 * | 8/2004 | Yamanaka ............. 369/112.23 |

FOREIGN PATENT DOCUMENTS

| | | |
|---|---|---|
| EP | 0 537 904 A2 | 4/1993 |
| EP | 0 549 488 A1 | 6/1993 |
| JP | 2-304721 | 12/1990 |
| JP | 5-205282 | 8/1993 |
| JP | 6-203412 | 7/1994 |
| JP | 8-306078 | 11/1996 |
| JP | 9-50639 | 2/1997 |
| JP | 9-73666 | 3/1997 |
| JP | 10-269611 | 10/1998 |
| JP | 11-259906 | 9/1999 |
| JP | 2000-315323 | 11/2000 |

OTHER PUBLICATIONS

Office Action (English–language translation attached), dated Mar. 30, 2004, from the Japanese Patent Office for Patent Application No. 2001–304571.

Japanese Office Action, dated Jun. 22, 2004 for Patent Application No. 2001–304571.

\* cited by examiner

*Primary Examiner*—Paul W. Huber
(74) *Attorney, Agent, or Firm*—Pillsbury Winthrop Shaw Pittman, LLP

(57) ABSTRACT

The present invention relates to an optical head device and an optical disk unit using the same. The optical head device includes a relay lens control unit to control at least one of lenses of a relay lens unit based on an output signal outputted from a first optical detector and a power control circuit to control an intensity of a light beam emits from a light source.

3 Claims, 8 Drawing Sheets

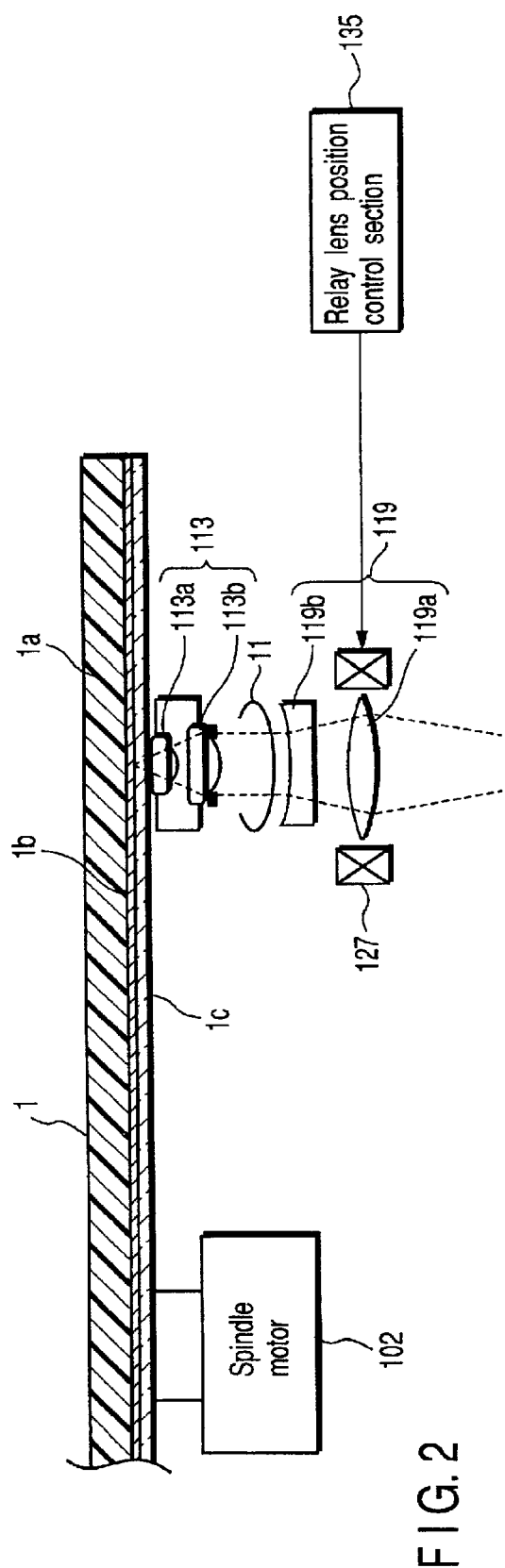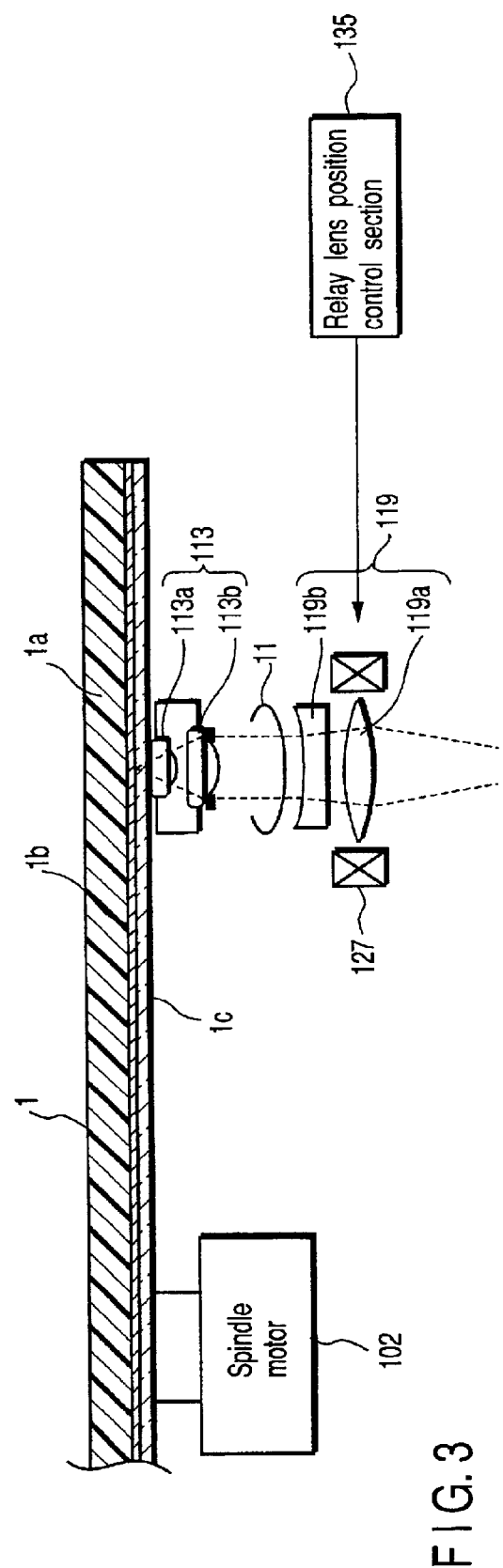

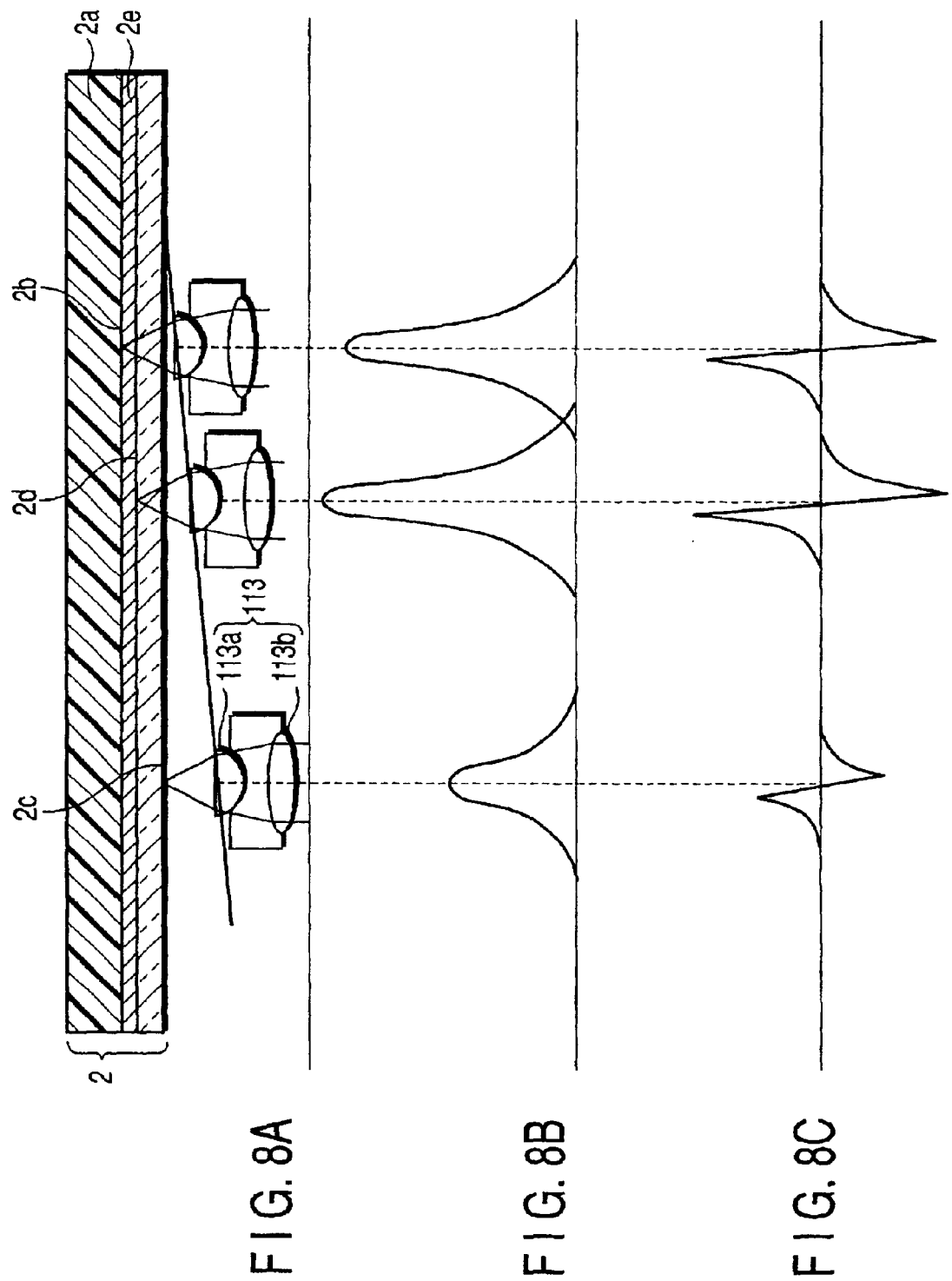

OPTICAL DISK UNIT FOR RECORDING OR REPRODUCING INFORMATION

CROSS-REFERENCE TO RELATED APPLICATIONS

This application is based upon and claims the benefit of priority from the prior Japanese Patent Application No. 2001-304571, filed Sep. 28, 2001, the entire contents of which are incorporated herein by reference.

BACKGROUND OF THE INVENTION

1. Field of the Invention

The present invention relates to an optical head for recording information into an optical disk and reproducing information from the optical disk and an optical disk unit having the optical head. In addition, the present invention relates to a method for eliminating an effect of a spherical aberration caused by the thickness error of a surface resin layer of an optical disk.

2. Description of the Related Art

In an optical head and an optical disk unit, in order to improve efficiency of utilizing light, there has been proposed a method and apparatus for reducing an effect of spherical aberration caused by the thickness error of a surface resin layer (light transmission layer) of an optical disk.

For example, in Jpn. Pat. Appln. KOKAI Publication No. 11-259906, there is disclosed an optical head 1 for emitting light from a light transmission layer 4 in a recording layer provided between a substrate 3 and the light transmission layer 4, wherein a collimator lens 13 and an actuator 14 for a collimator lens are provided, and the collimator lens 13 provided between a light source 10 and an objective lens 16 is moved so as to offset a spherical aberration caused by the thickness error of the light transmission layer 4.

In Jpn. Pat. Appln. KOKAI Publication No. 11-259906, when the collimator lens 13 is moved in order to correct the spherical aberration caused by the thickness error of the light transmission layer 4, no consideration is taken into the fact that a light quantity on the objective lens 16 changes. This causes a problem in the case where light intensity is set during reproduction in particular.

That is, in order to correct a spherical aberration caused by the thickness error of a light transmission layer, when a collimator lens is moved in an optical axis direction, the light amount incident to an objective lens is changed. Thus, there is a problem that the quantity of light emitted from the objective lens changes during information reproduction, and a recording mark cannot be precisely recorded during information recording.

In the above described publication, there is disclosed the thickness of a light transmission layer by using a return light from the surface of the light transmission layer and a return light from an information recording layer.

In addition, in the optical disk in which a plurality of recording layers are provided, a distance between each recording layer and the light transmission layer, i.e., the thickness in light transmission layer differs from one another. Thus, there is a problem that information recording and reproduction is more unstable.

BRIEF SUMMARY OF THE INVENTION

The present invention has been made in order to solve the foregoing problem. It is an object of the present invention to provide an optical head and optical disk unit and an optical disk capable of restraining a change in light quantity of light beams emitted from an objective lens, and ensuring stable signal reproduction even in the case where a collimator lens is moved in an optical axis direction in order to correct a spherical aberration caused by the thickness error of a light transmission layer that covers a recording layer.

According to a first aspect of the present invention there is provided an optical disk comprising;

a recording layer having information recorded therein; and a light transmission layer that protects this information recording layer, wherein there is provided an information recording region capable of recording information indicating characteristics of the light transmission layer.

According to a second aspect of the present invention, there is provided an optical disk unit that emits a light beam from a light transmission layer to an optical disk having an information recording layer and an optical transmission layer protecting the information recording layer, thereby recording information or reproducing information, the optical disk unit comprising:

a light source to emit a light beam used in recording information into an optical disk for recording and for reproducing information from the optical disk;

an objective lens that transmits the light beam from the light source through the light transmission layer of the optical disk, thereby focusing the transmitted light beam on the information recording layer of the optical disk;

a device that reads out information contained in a predetermined layer of the optical disk, the device reads out information contains characteristic of the light transmission layer of the optical disk;

a spherical aberration correction mechanism provided between the light source and the objective lens, the mechanism controlling a degree of a spherical aberration caused by the thickness error of the light transmission layer of the optical disk;

a spherical aberration correction mechanism control unit that controls an operation of the spherical aberration correction mechanism; and a light emitting amount control unit to control intensity of the light beam emitted from the light source based on the information of the light transmission layer of the optical disk.

According to a third aspect of the present invention, there is provided an optical disk unit that emits light beams from an optical transmission layer, thereby recording information or reproducing information into or from an optical disk having a plurality of recording layers divided in a thickness direction and a light transmission layer protecting a recording layer positioned at the outermost side, the optical disk unit comprising:

a light source that emits a light beam used for recording information into an information recording layer targeted for recording and reproducing information from an information recording layer targeted for reproducing;

an objective lens that transmits the light beam from the light source through the light transmission layer of the optical disk, thereby focusing light on the information recording layer of the optical disk;

a spherical aberration correction mechanism provided between the light source and the objective lens, the mechanism controlling a degree of a spherical aberration caused by the thickness error of the light transmission layer of the optical disk recorded in a predetermined position of the optical disk;

a spherical aberration correction mechanism control unit that controls an operation of the spherical aberration correction mechanism based on thickness error information of the light transmission layer of the optical disk recorded in a predetermined position in the optical disk; and a light emission intensity control unit that controls intensity of the light beam emitted from the light source based on information of the light transmission layer recorded in the optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a schematic diagram illustrating an exemplary operation of the optical head device shown in FIG. 1;

FIG. 3 is a schematic diagram illustrating an exemplary operation of the optical head device shown in FIG. 1, illustrating an exemplary operation in a direction opposite to that shown in FIG. 2;

FIGS. 8A to 8C are schematic views each illustrating one of the modified embodiments of an optical disk unit shown in a schematic view illustrating an example of output characteristics of a focusing error signal of the optical head unit shown in FIG. 6.

DETAILED DESCRIPTION OF THE INVENTION

Hereinafter, preferred embodiments of the present invention will be described in detail with reference to the accompanying drawings.

Figure 1:
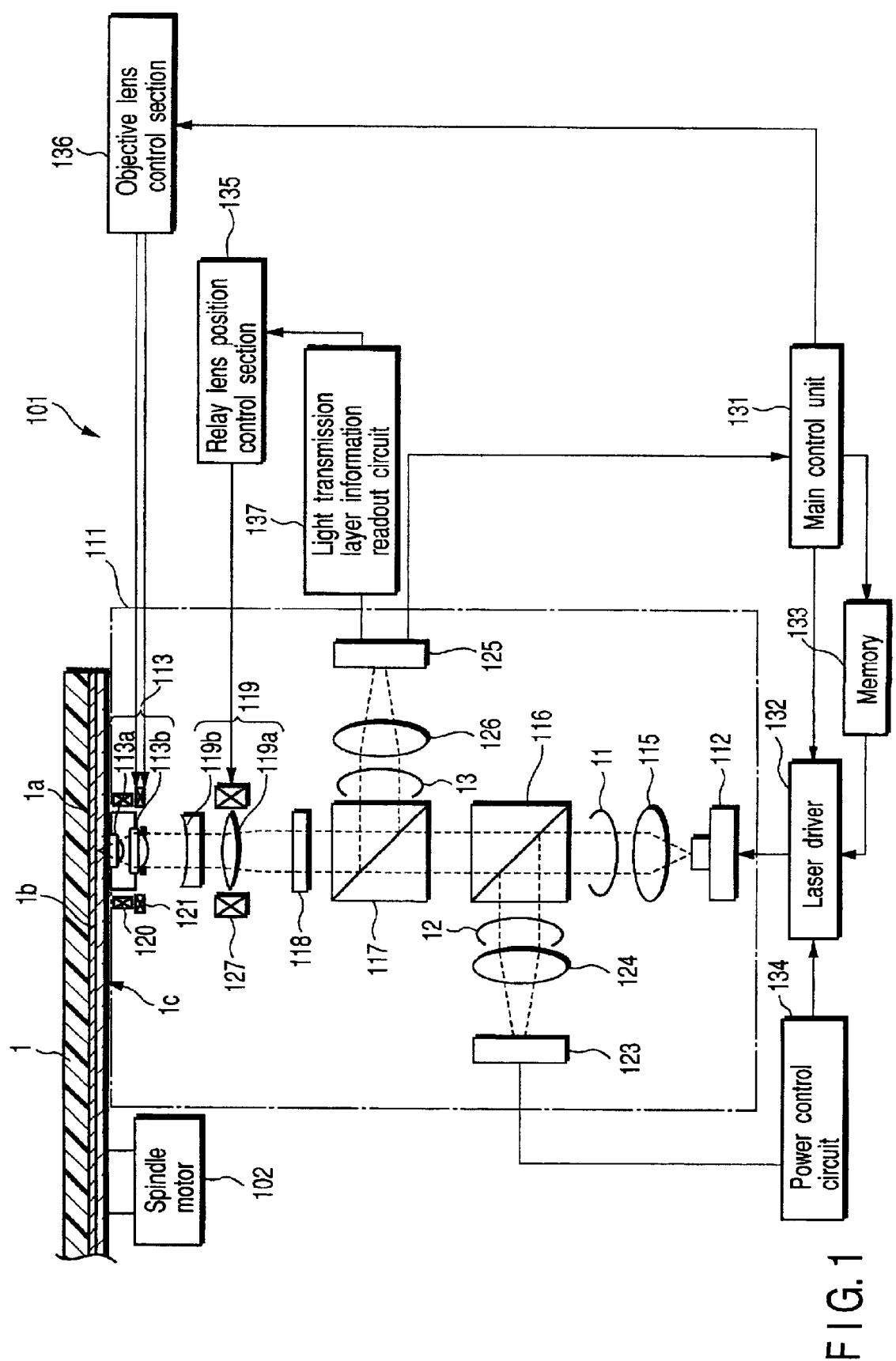
FIG. 1 is a schematic diagram illustrating an example of an optical head device and an optical disk unit utilizing the optical head device according to the present invention.

As shown in FIG. 1, an optical disk unit 101 for recording information into an information recording medium, i.e., an optical disk 1, and reproducing information from the optical disk 1 includes, a spindle motor 102 that rotates the optical disk 1 at a predetermined speed, and an optical head unit 111 that emits a light beam in a predetermined spot diameter to the optical disk 1 and receiving the reflection light beam reflected at the optical disk, thereby obtaining a predetermined electrical signal.

The optical disk 1 is composed of a phase change type recording layer 1b provided at one face of a substrate 1a in a predetermined thickness, and a transparent protection layer (light transmission layer) 1c that covers the recording layer 1b. The thickness of the substrate 1a is about 1.1 mm, and the thickness of the transparent protection layer 1c is about 0.1 mm. In addition, the thickness of the recording layer 1b is n×10 micrometers. Although not shown, a reflection film and/or a protection layer may be provided at the recording layer 1b.

The optical head device 111 has a laser unit 112 that emits a light beam (laser beam) in a predetermined wavelength to the optical disk 1, an objective lens 113 that focuses a laser beam 11 emitted from the laser unit 112 at the recording layer 1b of the optical disk 1.

Between the laser unit 112 and the objective lens 113, there are provided in order from the side of the laser unit 112, a collimator lens 115 that collimates a laser beam 11 emitted from the laser device 112, a first beam split 116 that splits the laser beam 11 collimated by the collimator lens 115 and a reflection laser beam 12 reflected at the recording layer 1b of the optical disk 1 from each other, a second beam splitter 117 that splits the laser beam 11 oriented to the recording layer 1b of the optical disk 112 passed through the first beam splitter 116 and the reflection beam 12 reflected at the recording layer 1b of the optical disk 1 with each other, a λ/4 waveform plate 118 that matches isolation between the laser beam 11 passed through the second beam splitter 117 and oriented to the recording layer 1b of the optical disk 1 and the reflection laser beam 12 reflected at the recording layer 1b of the optical disk 1, and a relay lens 119 capable of changing at least one of the sectional shape and area of the laser beam 11 passed through the λ/4 waveform plate 118.

The laser unit 112 is a semiconductor laser diode, for example, and emits a laser beam 11 of 400 nm in wavelength, for example.

The laser unit 112 emits the laser beam 11 with the corresponding light intensity by light emission according to each of ones for the recording, reproduction, and erasing light intensities being instructed by a laser driver 132 connected to a main control unit 131. A laser beam whose light emission intensity is intensity modulated in accordance with recording data held in a memory 133, for example, is outputted to the laser driver 132 during recording. In addition, during reproduction, a laser beam whose light intensity is 1/n to 1/n×10 of that of the recording laser beam is outputted. On the other hand, during erasing, a laser beam having a predetermined light intensity between the light intensity of reproduction laser beam and the light intensity of recording laser beam.

The objective lens 113 includes two lenses 113a and 113b, and the number of apertures indicated by NA is set within the range from 0.8 to 0.95. For example, in the embodiments of the present invention, NA is about 0.85.

At a predetermined position of a lens holder (not shown) that holds the objective lens 113, in order to ensure a distance between the objective lens 113 and the recording layer 1b of the optical disk 1 coincides with a focal length of the objective lens 113, there are provided, a focus coil 120 for generating a propelling force for moving the objective lens 113 along an optical axis O defined between the laser unit 112 and the objective lens 113, and a magnetic field generating unit (not shown) that generates a magnetic field that is resistive to the propelling force provided by the focus coil 120.

At a predetermined position of a lens holder (not shown), there are provided, a track coil 121 that generates a propelling force to ensure that the center of the laser beam 11 passing through the objective lens 113 coincides with a predetermined position in the radial direction of the recording layer 1b of the optical disk 1, for example, the center of a pit row (not shown) or guide groove (not shown) formed in advance at the recording layer 1b, and a magnetic field generating unit (not shown) that generates a magnetic field that is resistive to the propelling force from the track coil 121.

The laser beam 12 split from the laser beam 11 oriented to the optical disk 1 by the first beam splitter 116 is incident to a light receiving face (not shown) of the first light detector 123 after predetermined convergence (focusing characteristics) has been provided by the first focusing lens 124 provided between the splitter and the first light detector 123.

An electrical signal outputted from the first light detector 123 is inputted to the power control circuit 134, and the outputted electrical signal is fed back as a signal indicating a change in light intensity of the laser beam 11 to the laser driver 132 through the main control unit 131. The power control circuit 134 is generally called an APC light detector.

An output of the power control circuit 134 is used for feedback control of a laser drive signal supplied from the laser driver 132 to the laser unit 112 after a predetermined gain has been provided by a gain controller (not shown) integrally incorporated in the main control unit 131, for example, or incorporated between the power control circuit 134 and the laser driver 132. In this manner, the light intensity of the laser beam 11 emitted from the laser unit 112 and oriented to the objective lens 113 is controlled approximately constantly.

The reflection laser beam 13 split from the laser beam 11 oriented to the recording layer 1b of the optical disk 1 by means of the second beam splitter 117 is focused in a detection region (not shown) of the second light detector 125 after predetermined convergence (focusing characteristics) has been provided by the second focusing lens 126 provided between the splitter and the second light detector 125. The detection region (not shown) of the second light detector 125 has a plurality of detection regions of a predetermined shape and area that receives the laser beam 12 split from the laser beam 11, and outputs a predetermined electrical signal that corresponds to the light intensity of the laser beam 12.

An output signal converted by the second light detector 125 in a photoelectric manner is converted into a voltage change by a current-voltage converter amplifier (not shown). The converted signal is supplied to a signal processor circuit provided at a later stage via a main control unit 131 as an output which is a source of a focus error signal "FE", a track error signal "TE", and a reproduction signal "RF" indicating a deviation of a positional error of the objective 113, for example, i.e., a deviation indicating a deviation of a respective one of the focusing direction and track direction. For example, the focusing error signal "FE" and the track error signal "TE" are inputted to the objective lens control section 136. The focus error signal "FE" and track error signal "TE" inputted to the objective lens control section 136 are converted into a control quantity to be supplied to the focusing coil 120 and track coil 121 by the objective lens control section 136, respectively, and is used for generating a propelling force for moving the objective lens 113.

A predetermined component of an output from the second light detector 125 is inputted to the light transmission layer information readout circuit 137 as a reproduction signal of information concerning the thickness error of the light transmission layer (transparent cover layer) 1c recorded in the recording layer 1b of the optical disk 1 or a deviation of refractive index. Information concerning the thickness error and a deviation of refractive index of the light transmission layer (surface cover layer) 1c read out by the light transmission layer information readout circuit 137 is used for position control of the relay lens 119.

The relay lens 119 includes first and second lenses 119a and 119b disposed along the optical axis O. One of these two lenses, for example, the lens 119a in the present embodiment is formed to be movable along the advancement direction of the laser beam 11 (optical axis O between the laser unit 112 and the optical lens 113). The first lens 119a is a convex lens, for example, and the second lens 119b is a concave lens, for example. A position control coil 127 that generates a propelling force for moving the lens 119a, and a magnetic field generating unit (not shown) that generates a magnetic field that is resistive to the propelling force from the position control coil 127 are provided at a lens holder (not shown) that holds a movable lens, i.e., the convex lens 119a. One lens of the relay lens 119, i.e., the convex lens 119a in the present embodiment is moved along the optical axis O from a magnetic field generated by the magnetic field generating unit and a magnetic field generated by a current being supplied to the position control coil 127. The magnitude of the current supplied to the position control coil 127 is set to a predetermined magnitude set by a relay lens position control section 135.

Now, a relay lens position control section will be described here.

A relay lens position control section 135 supplies a drive current has a predetermined value to the position control coil 127. The drive current has a direction in which the convex lens 119a is moved to the laser unit 112 or a direction in which the convex lens 119a is moved to the objective lens 113 based on the predetermined electrical signal outputted from the second light detector 125.

When a drive current in a predetermined direction is supplied to the position control coil 127, whereby the convex lens 119a is moved to the laser unit 112, the sectional diameter (and area) of the laser beam 11 incident to the objective lens 113 is increased as shown in FIG. 2.

On the other hand, when a drive current in a direction providing movement in a direction opposite to a direction that enables movement of the convex lens 119a shown in FIG. 3 is supplied to the position control coil 127, the convex lens 119a is moved to the objective lens 113. In this case, the sectional diameter (and area) of the laser beam split 11 emitted by the objective lens 113 is decreased as shown in FIG. 3.

In detail, in the relay lens 119, when the thickness of the light transmission layer 1c of the optical disk 1 is set to a specified value, for example, 0.1 mm, the laser beam 11 oriented from the laser unit 112 to the recording layer 1b of the optical disk 1 while a drive current is not supplied to the position control coil 127 is designed so as to be incident as light parallel to the objective lens 113.

In contrast, when the thickness of the light transmission layer 1c of the optical disk 1 is set to thickness deviated from a predetermined thickness, the drive current in a direction in which the convex lens 119a is moved is supplied in any direction as shown in FIG. 2 or FIG. 3 to the position control coil 127 by the relay lens position control section 135. That is, in the case where the thickness of the light transmission layer 1c of the optical disk 1 is deviated from the specified thickness, a spherical aberration caused by the thickness error of the light transmission layer 1c occurs. Thus, in order to correct the spherical aberration caused by the thickness error of the light transmission layer 1c, the convex lens 119a of the relay lens 119 is moved by a predetermined amount in a predetermined direction.

In more detail, when the thickness of the light transmission layer 1c of the optical disk 1 comes out of the specified value, the convex lens 119a of the relay lens 119 is moved along the optical axis according to the direction (error amount) in thickness error of the light transmission layer 1c of the optical disk 1, and the laser beam 11 incident to the objective lens 113 is changed to convergence light or divergence light, whereby an effect of the spherical aberration caused by the thickness error of the light transmission layer 1c can be eliminated.

Specifically, when the thickness of the light transmission layer 1c of the optical disk 1 is larger than the predetermined value, the convex lens 119a of the relay lens 119 may be moved along the optical axis O so that the laser beam 11 incident to the objective lens 113 is produced as divergence light according to the error quantity in thickness of the light transmission layer 1c. In contrast, when the thickness of the light transmission layer 1c is smaller than the predetermined value, the convex lens 119a of the relay lens 119 may be moved along the light axis O so that the laser beam 11 incident to the objective lens 113 is produced as convergence light according to the error quantity in thickness of the light transmission layer 1c.

In other words, the convex lens 119a (either one of the convex lens and concave lens) of the relay lens 119 is moved in any direction shown in FIG. 2 or FIG. 3, and the laser beam 11 incident to the object lens 113 is converted into convergence light or divergence light so as to correct the spherical aberration caused by the thickness error of the light transmission layer 1c of the optical disk 1. That is, the laser beam 11 passed through the object lens 113 and focused in the recording layer 1b of the optical disk 1 is focused into the recording layer 1b in a focusing spot shape distorted according to a degree of error when an error occurs with the thickness of the light transmission layer 1c positioned in front of the recording layer 1b. Here, the laser beam 11 incident to the objective lens 113 is made divergent or convergent when the convergence properties or divergent light and polarity (orientation) approximately equal to a quantity of the spherical aberration applied to the laser beam 11 due to the thickness error of the light transmission layer 1c in size and assigned by the thickness error of the light transmission layer 1c are reversed, whereby an effect of the thickness error of the light transmission layer 1c can be offset by a distance between the convex lens 119a and concave lens 119b of the relay lens 119.

In the first embodiment shown in FIGS. 1 to 3, there has been illustrated an example of detecting the thickness of the light transmission layer 1c before the optical disk 1 rotates. However, for example, an information indicating, for indicating a change in thickness of the light transmission layer 1c, is recorded in advance in a predetermined region of the recording layer 1b of the optical disk 1, whereby, prior to recording or reproduction, the information indicating a change in thickness of the light transmission layer 1c is read, and a position of the convex lens 119a of the relay lens 119 may be controlled so as to offset an effect of the thickness error of the light transmission layer in a region or at a position where the thickness of the light transmission layer 1c changes.

Figure 4:
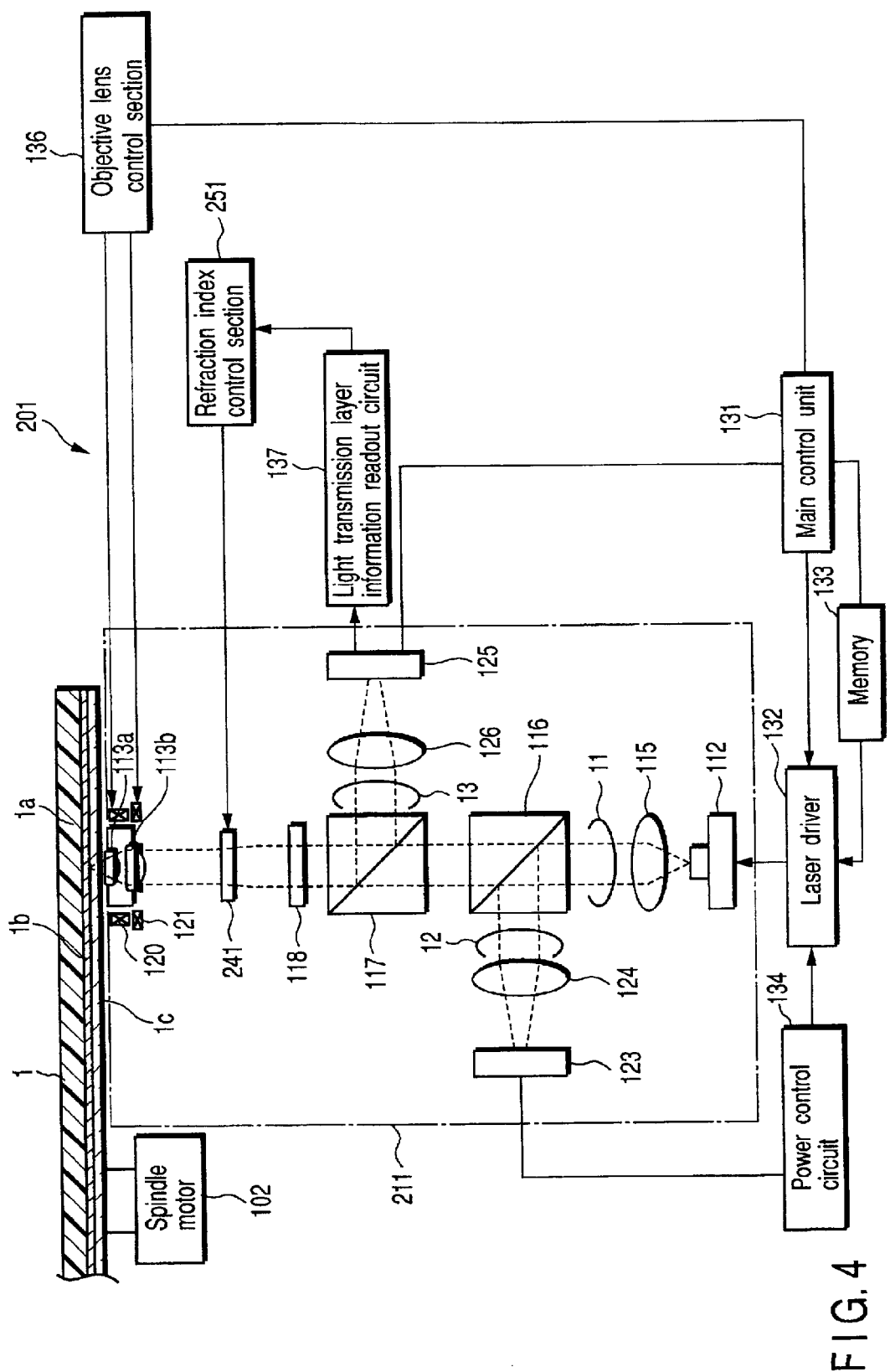
FIG. 4 is a schematic diagram illustrating an example of another embodiment of the optical disk shown in FIG. 1.

In addition, in the above described embodiment, there has been illustrated an example of a method for correcting a change in light quantity of the laser beam caused by the thickness error of the light transmission layer 1c positioned between the recording layer 1b of the optical disk 1 and the laser unit 112, wherein the relay lens 119 includes the convex lens 119a and the concave lens 119b is used, thereby moving one of these lenses. However, in correcting a spherical aberration, as shown in FIG. 4, similar advantageous effect is obtained by using, an optical element capable of changing a refractive index by an external signal, for example, a liquid crystal element 241 change able refractive index depending on an applied voltage of ECB (Electrically Controlled Birefringence) type and a spherical aberration correction quantity control unit (Refractive index control section) 251 for changing a refractive index of the liquid crystal element 241. In the optical disk unit 201 shown in FIG. 4, the liquid crystal element 241 of ECB type is used instead of the relay lens 119 of the optical head device 111 and the position control coil 127 shown in FIG. 1, and the relay lens position control 135 is merely replaced with the spherical aberration correction quantity control section 251, and thus, a detailed description of the other common configuration is omitted here.

In this case, as a control value supplied to the spherical aberration correction quantity control unit 251, of course, there can be used as is the control value indicating the position of the objective lens 113 obtained from the output signal outputted from the second light detector 117 shown in FIGS. 1 to 3.

In the above described embodiment, although a description has been given by way of an example of an optical disk of phase change type, the present invention can be used for a variety of optical head devices and optical disk units for recording media each having a light transmission layer. In addition, a reproduction only disk, a magneto-optical disk, an optical card or the like can be applied as a recording medium.

In the meantime, if information on the thickness error of the light transmission layer 1c of the optical disk 1 is recorded in advance in the recording layer 1b of the optical disk 1, the process and time for measuring thickness caused by the above described relay lens 119 and/or setting a movement quantity of a convex lens 119a is reduced. From this fact, in formatting (initializing) the optical disk 1, for example, if the information obtained by measuring the thickness of the light transmission layer 1c can be recorded into the optical disk 1, when the same optical disk 1 is set to the optical disk unit 101 at a second time or later, the time required for start of information recording or start of information reproduction is reduced.

Thus, in the optical disk 1 shown in FIG. 1 (FIGS. 2 and 3) and FIG. 4, information on error in thickness of the above described light transmission layer (surface cover layer) 1c can be recorded. As an area capable of recording information on a thickness error, for example, there can be used, a read-in-area (DVD-RAN disk) specific to the optical disk 1 or BCA (Burst Cutting Area, DVD-ROM disk) data field 1e.

The read-in-area 1d is a region in which information concerning each element of the optical disk 1, and is a region in which information is first read during start of information recording or disclosure of information reproduction. In a DVD-specified optical disk of 120 mm in diameter, the read-in-area 1*d* is defined within 25 mm in a radial direction from the inner-most periphery. In an actual optical disk, i.e., in the DVD-RAM disk, this region corresponds to a region disclosed on page PH-117 of "DVD Specifications for Rewritable Disc (DVD-RAM) Part I PHYSICAL SPECIFICATIONS Ver. 1.0 July 1997. In this region, for example, information on thickness of the light transmission layer 1*c* can be recorded in a Disc identification zone, for example. Preferably, information on the thickness error of the light transmission layer 1*c* contains information on a plurality of segments that can be obtained when the radial direction is segmented in predetermined number N while rotation of the optical disk 1 is stopped, and the direction in rotation angle (radiation opening angle) relevant to an axis passing the center of an inner diameter is segmented in predetermined number M. In this manner, even in the case where the thickness of the light transmission layer 1*c* is not constant in the whole region of the recording layer 1*b*, an effect of the thickness error can be finely controlled.

On the other hand, in the DVD-ROM disk, the read-in-area corresponds to a region called a burst cutting area disclosed on page PHX-16, "DVD Specifications for Read-Only Disc Part PHYSICAL SPECIFICATIONS Ver. 1.01 December 1997. A BCA data field 1*e* is a region allocated as a region for recording required information after manufacture of the optical disk has been completed. In addition, preferably, information on the thickness error of the light transmission layer 1*c* contains information on a plurality of segments that can be obtained when the radial direction is segmented in predetermined number N while rotation of the optical disk 1 is stopped, and the direction in rotation angle (radiation opening angle) relevant to an axis passing the center of an inner diameter is segmented in predetermined number M. In this manner, even in the case where the thickness of the light transmission layer 1*c* is not constant in the whole region of the recording layer 1*b*, an effect on the thickness error can be finely controlled.

Figure 5:
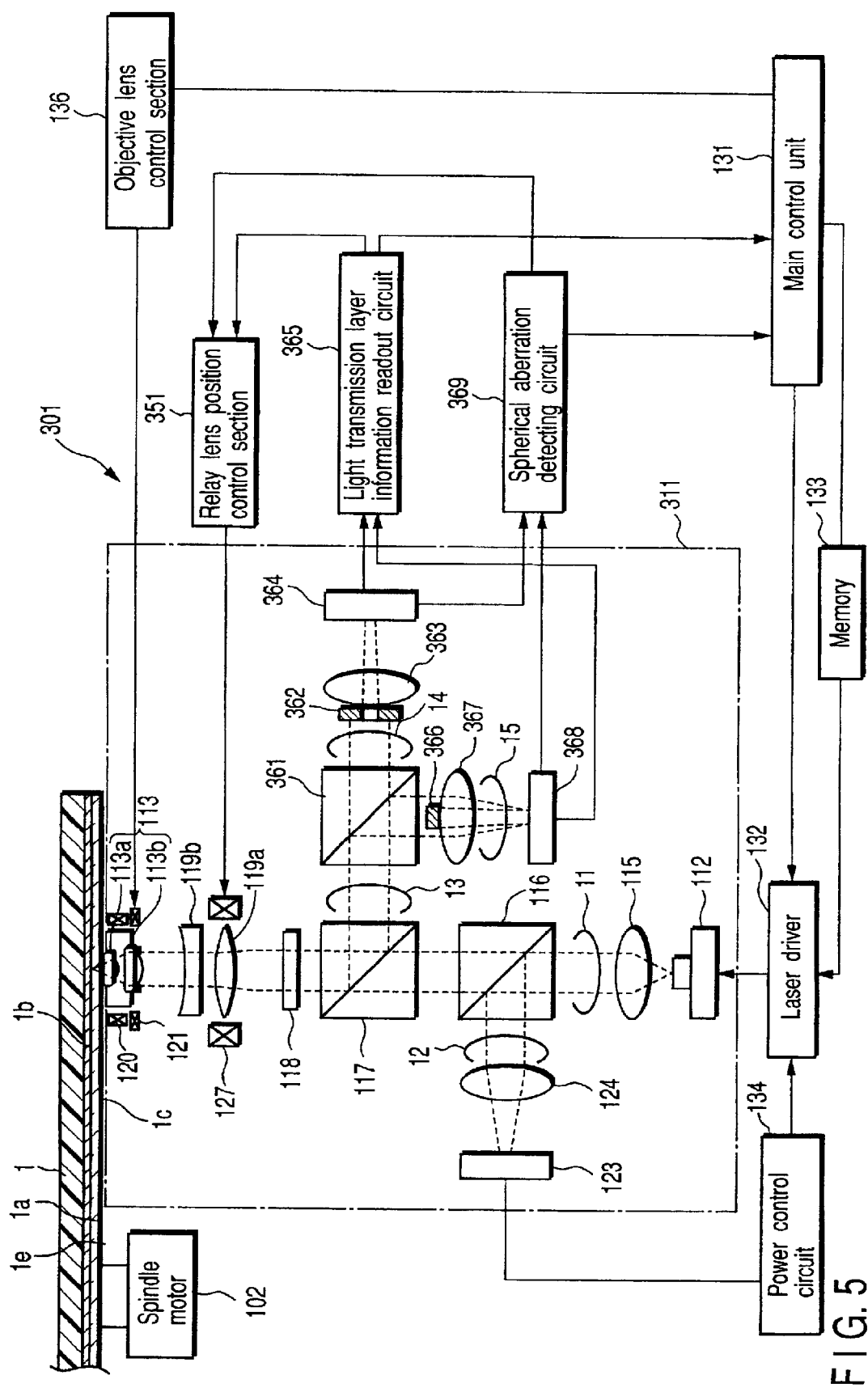
FIG. 5 is a schematic diagram illustrating an example of another embodiment of the optical disk shown in FIG. 1.

FIG. 5 is a schematic view illustrating another embodiment of the previously described optical disk unit with reference to FIG. 1 (FIGS. 2 and 3) and FIG. 4. Like elements of the previously described configuration are designated by like reference numerals. A detailed description is omitted here.

In the optical disk unit 301 shown in FIG. 5, the third laser beam 13 diverged from the laser beam 11 oriented to the optical disk 1 by the second beam splitter 117 is incident to the third beam splitter 361, and further, the incident beam 13 is divided into two laser beams 14 and 15.

One laser beam 14 is focused on a light receiving face (not shown) of the second light detector 364 via the second focusing lens 363 after the diameter (sectional area) has been restricted by the aperture 362. In this manner, an output signal that corresponds to the light intensity of the (detection) laser beam 14 whose transmission light quantity is restricted is outputted from the second light detector 364.

An output from the second light detector 364 is supplied to the spherical aberration detector circuit 369 that detects a spherical aberration being information for obtaining a quantity of movement of the light transmission layer information readout circuit 365 that reads out information on thickness of the light transmission layer 1*c* and the convex lens of the relay lens 119.

Another laser beam 15 is focused in a light receiving face (not shown) of the third light detector 368 via the third focusing lens 367 after there has been restricted the sectional area (transmission light quantity) defined by the light interrupt plate 366 capable of interrupting laser beams positioned at the center and in the vicinity of the plate.

In this manner, an output signal that corresponds to the light intensity of the (detection) laser beam 15 whose transmission light quantity has been restricted is outputted from the third light detector 369.

An output from the third light detector 369 is supplied to the spherical aberration detector circuit 369 that detects a spherical aberration being information for obtaining a value of movement of the light transmission layer and information readout circuit 365 that reads out information on thickness of the light transmission layer 1*c* and the convex lens of the relay lens 119.

The information on the thickness error of the light transmission layer 1*c* recorded in the read-in-area 1*d* or BCA data field 1*e* of the optical disk 1 is read out by the light transmission layer information readout circuit 365 and the spherical aberration detector circuit 369, and a degree of the spherical aberration is detected in parallel.

In this way, the information on the light transmission layer 1*c* is read from the optical disk 1 (in which the thickness error of the light transmission layer 1*c* is recorded in advance) by means of the light transmission layer readout circuit 365, and a direct current component or an initial value having the direct current component superimposed on a alternating current of a predetermined amplitude (strength) is provided to the relay lens position control section 135, and a feedback control can be then applied to the relay lens position control section 135 based on information on the spherical aberration obtained via the spherical aberration detector circuit 369. This method makes it possible to draw a feedback more easily and at a high speed as compared with an example shown in FIGS. 1 and 4 each.

Now, an optical disk unit capable of recording information into an optical disk with an at least double-layered recording layer capable of recording and reproducing information or capable of reproducing information from the optical disk will be described with reference to FIG. 6. A configuration of the optical disk unit 401 is common in many portions irrespective of the number of recording layers. Like elements identical to those of another optical disk unit are designated by like reference numerals. A detailed description is omitted here.

Figure 6:
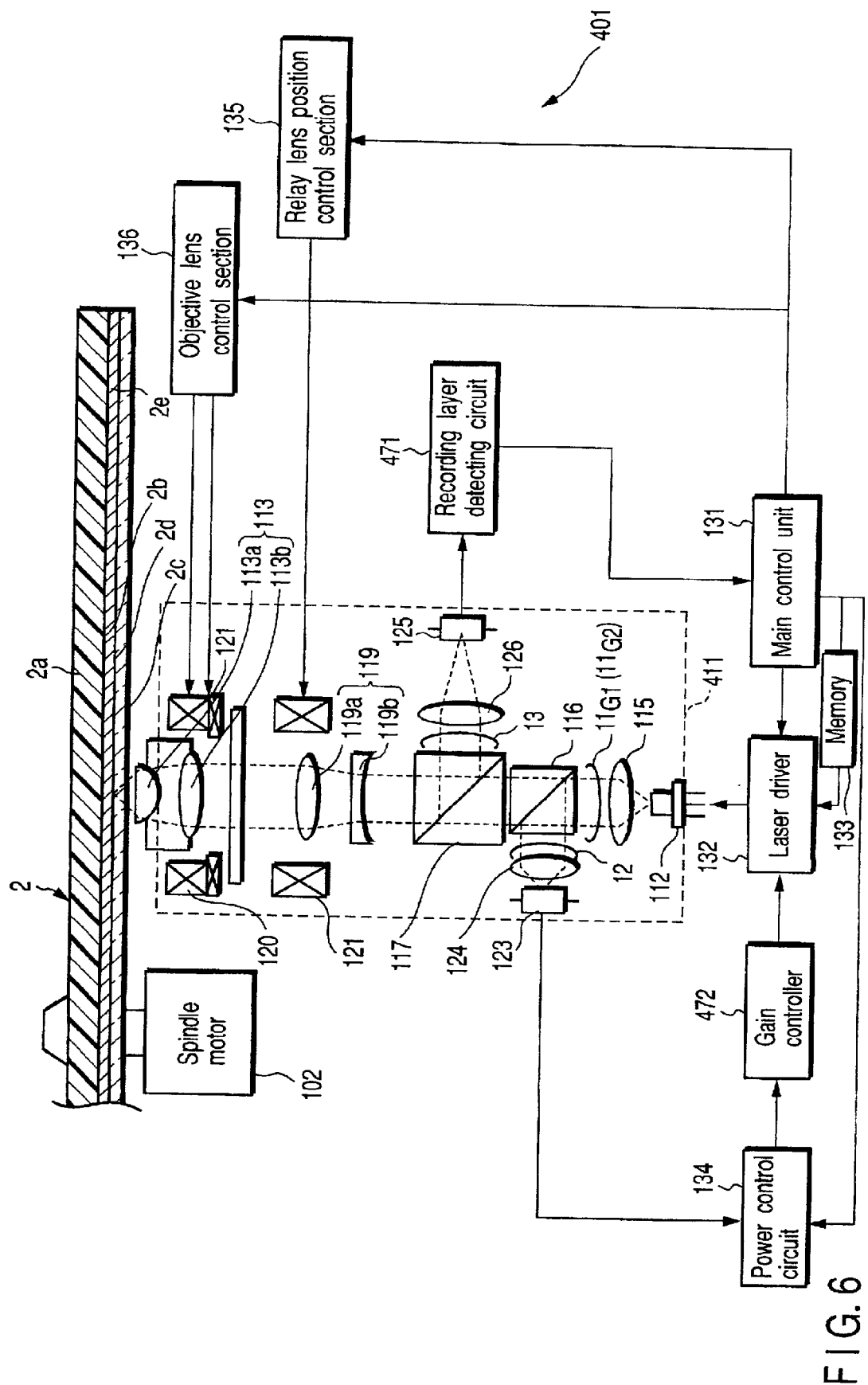
FIG. 6 is a diagram illustrating an example of still another embodiment of the optical disk unit shown in FIG. 1.

FIG. 6 shows an exemplary operation for correcting a focus control of the objective lens for each recording layer of the optical disk and a spherical aberration of the relay lens. The optical disk 2 includes, for example, a substrate 2*a*, a first recording layer 2*b* formed at the substrate 2*a*, a second recording layer 2*d* formed at a position that is more distant from the substrate 2*a* than the first recording layer 2*b*, and a surface cover (light transmission layer) 2*c* that protects a spacer layer 2*e* and a second recording layer (a layer opposite to the substrate 2*a*) positioned between both of the substrates.

A configuration of the optical disk unit 401 shown in FIG. 6 is additionally provided, a recording layer detecting circuit 471 capable of specifying a recording layer in a state in which the objective lens is focused (ON-focused) as compared with an optical disk unit (optical disk unit shown in FIG. 1, 4, or 5) capable of recording information into the optical disk with only one recording layer and reproducing information, and a gain controller 472 that controls a gain of a laser drive signal inputted to the laser driver 132 from the power control circuit 134. A principle of a detection of the layer in which the objective lens is focused is mentioned after by using of FIGS. 8A to 8C.

Figure 7B:
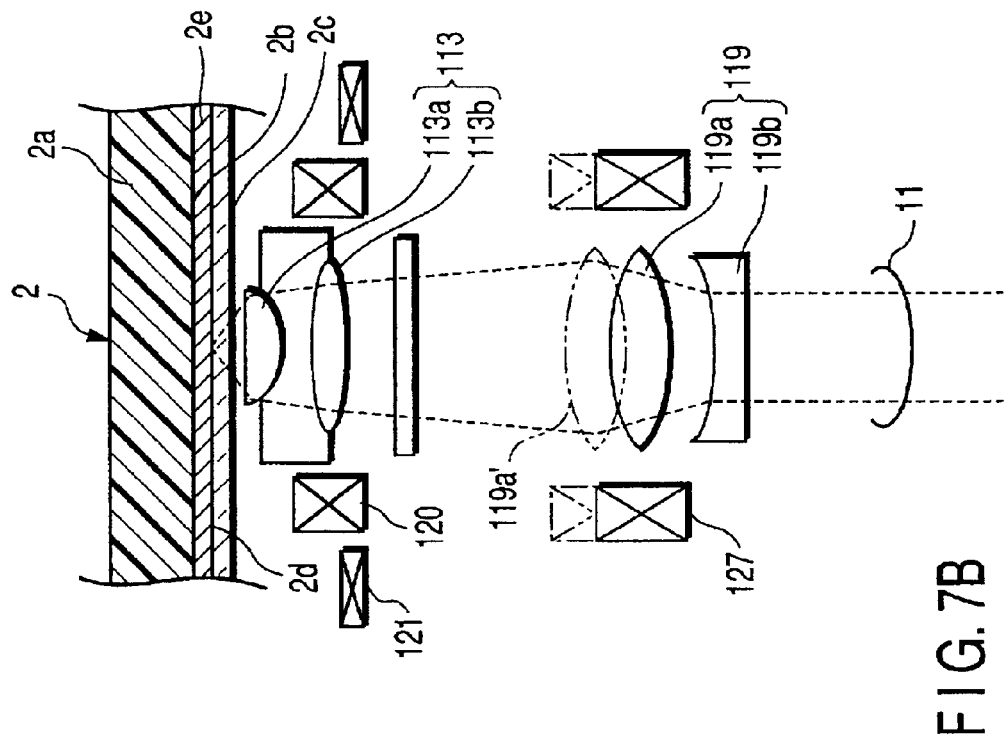
FIGS. 7A and 7B are schematic views each illustrating an exemplary operation of a relay lens of an optical head unit shown in FIG. 6.
Figure 7A:
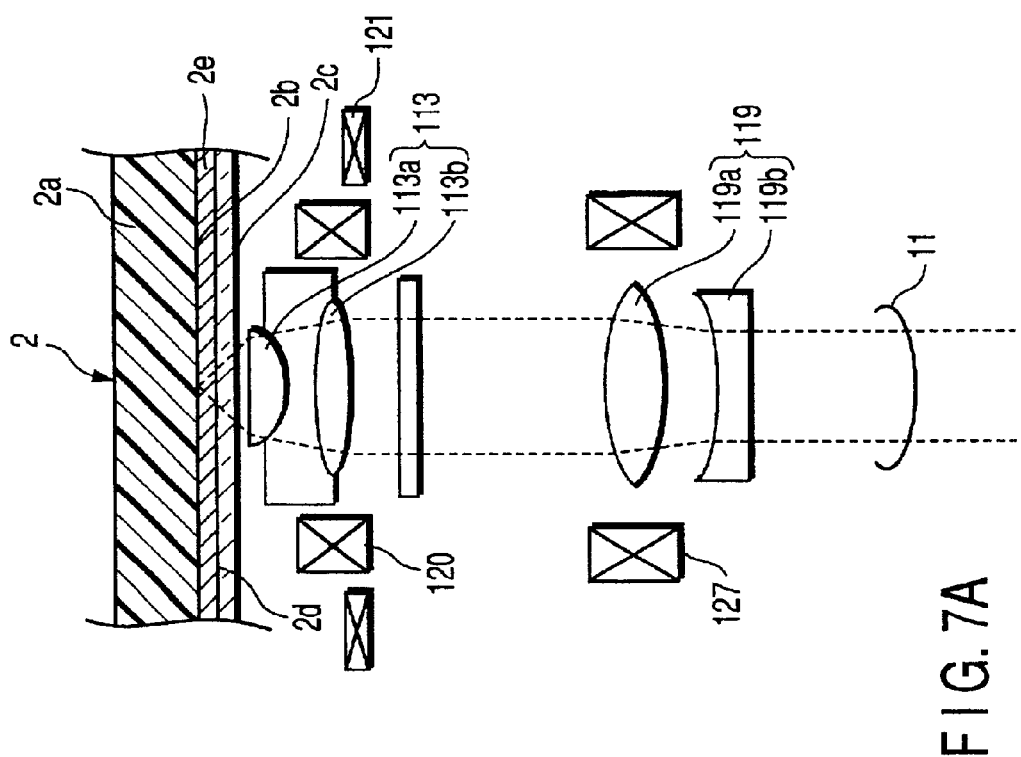

In the optical disk unit 401 shown in FIG. 6, as shown in FIG. 7A, the relay lens 119 is designed so that the laser beam 11 incident to the objective lens 113 is a parallel light (in a state in which no change in sectional shape or area occurs) while information is recorded into one of the two recording layers 2b and 2d of the optical disk, for example, into the recording layer 2b close to the substrate 2a. That is, information is recorded into the remaining recording layer 2d of the two recording layers (close to the light transmission layer 2c) when a case in which the thickness of the light transmission layer 2c of the optical disk 2 is a standard value (0.1 mm) is defined as a reference. Alternatively, when information is reproduced from the recording layer 2d, a spherical aberration occurs by a distance from the surface of the light transmission layer 2c to the recording layer 2d being shorter (narrower) as compared with a distance from the surface of the light transmission layer 2c to the recording layer 2b.

In this way, when information is recorded into individual recording layers of the optical disk 2 having two or more recording layers provided thereat or when information is reproduced from such individual recording layers, the convex lens 119a of the relay lens 119 is moved in an optical axis direction in order to correct a spherical aberration caused by a difference in distance between the recording layer having information recorded therein or having information in reproduction and the optical transmission layer.

For example, in the case where the thickness of the light transmission layer 2c is small, the convex lens 119a of the relay lens 119 is moved by a predetermined distance in a direction close to the substrate 2a of the optical disk 2 (distant from the concave lens 119b), and set at a position designated by 119a'. In other words, the convex lens 119a of the relay lens 119 is moved so as to correct a spherical aberration caused by a change in distance between the recording layer targeted for recording/reproduction and the light transmission layer, whereby the light incident to the objective lens 113 is produced as convergent or divergent light.

In more detail, in the case where the objective lens 113 is focused in the first recording layer 2b of the optical disk 2, predetermined focusing properties are provided to the laser beam 11 by the objective lens 113, and the convex lens 113 of the relay lens 119 is set at a first position capable of correcting an effect of a spherical aberration.

At this time, an output signal of the power control circuit 134 inputted to the laser driver 132 corresponds to an output from the first light detector 123, and is produced as a signal corrected by a first gain $G_1$ by a gain controller 472.

Therefore, a laser beam $11_{G1}$ of the light intensity corresponding to the scale of a drive current corrected by the first gain $G_1$ from the laser driver 132 is emitted from the laser unit 112. In other words, the light quantity of the laser beam $11_{G1}$ focused on the first recording layer 2b of the optical disk 2 by the objective lens 113 is corrected according to a distance between the recording layer 2b and the light transmission layer 2c.

On the other hand, predetermined focusing properties are provided by the objective lens 113. Thus, when the laser beam 11 is focused on the first recording layer 2b, and when the light intensity is controlled relevant to a distance between the recording layer 2b and the light transmission layer 2c, if an attempt is made to record information in the second recording layer 2d or reproduce information, the convex lens 119a of the relay lens 119 is moved by a predetermined amount. Thus, the light intensity of the laser beam 11 focused on the recording layer 2d must be, of course, changed.

However, the light intensity of the laser beam $11_{G1}$ incident to the objective lens 113 is managed by the first gain $G_1$ by the gain controller 472, and thus, this light intensity does not coincide with the light quantity of laser beam to be focused on the second recording layer 2d of the optical disk 2. That is, when the laser beam $11_{G1}$ corrected by the gain $G_1$ of the first recording layer 2b is used by the gain controller 472, either of the convergence or divergence is provided to the cross section of the laser beam 11 incident to the objective lens 113 by means of correction of the spherical aberration caused by the objective lens 119. Thus, in actuality, the light quantity of the laser beam 11 incident to the objective lens 113 changes. Of course, in this case, even if the light intensity of the laser beam emitted from the laser unit 112 is constantly controlled, the light quantity of the laser beam 11 focused on the second recording layer 2d of the optical disk 2 cannot be maintained at a predetermined level by the objective lens 113.

This causes a change in light quantity of the laser beam 11 on the recording face 2d when information recorded in the second recording layer 2d of the optical disk 2 is reproduced, and causes a change in light quantity of the laser beam 11 on the optical disk 2d during information recording, i.e., a change in energy quantity capable of producing a phase change in the recording layer 2d.

Thus, when the objective lens 113 is focused on the second recording layer 2d of the optical disk 2, it is required to correct the light intensity to be applied to the laser beam 11 by the second gain $G_2$ suitable to the second recording layer 2d by the gain controller 472 even if the scale of the output signal of the power control circuit 134 inputted to the laser driver 132 corresponds to an output from the first light detector 123 in consideration of the fact that predetermined focusing properties are provided by the objective lens 113, and the convex lens 119a of the relay lens 119 is set to a second position such that an effect of a spherical aberration can be corrected. That is, when information is recorded into the second recording layer 2d or when information is reproduced from the second recording layer 2d, the light intensity of the laser beam 11 must be set to a laser beam $11_{G2}$ with light intensity that corresponds to the scale of the drive current corrected by the second gain $G_2$ from the laser driver 132. In other words, the light quantity of the laser beam $11_{G2}$ focused on the second recording layer 2d of the optical disk 2 by the objective lens 113 is corrected according to a distance between the recording layer 2d and the light transmission layer 2c.

In this way, according to a physical quantity represented by a distance between the recording layer 2b and the light transmission layer 2c, a distance between the recording layer 2d and the light transmission layer 2c, and a distance between the convex lens 119a and concave lens 119b of the relay lens 119 (amount of spherical correction), the scale of a laser drive current supplied from the laser driver 132 to the laser unit 112 (already set by the power control circuit 134) is further corrected by a gain according to the recording layer in accordance with a recording layer in which the laser beam is focused by the objective lens 113, whereby the light intensity of the laser beam 11 incident to the objective lens 113 can be constantly maintained. This makes it possible to ensure stable information recording and reproduction at a generally equal level relevant to individual recording layers of an optical disk having a plurality of recording layers provided thereat.

Although FIGS. 6, 7A and 7B each have illustrated a state in which the laser beam 11 incident to the objective lens 113 is produced as a parallel luminous flux (reference value of a normal position of the relay lens 119) by way of example when a recording layer in which the laser beam 11 is focused by the objective lens 113, i.e., a recording layer in which information recording and reproduction are executed, is the first recording layer 2b close to the substrate 2a, a state in which the laser beam 11 incident to the objective lens 113 is produced as a parallel luminous flux parallel (reference value of the normal position of the relay lens 119) may be, of course, set to the second recording layer 2d close to the light transmission layer 2c.

In addition, even in the case where a state in which the laser beam 11 incident to the objective lens 113 is produced as a parallel luminous flux does not coincide with a recording layer in which information recording into and reproduction from any recording layer are executed, a position of the convex lens 119a of the relay lens 119 illustrated with reference to FIG. 7B is moved in an optical axis direction, thereby making it possible to constantly record and reproduce information irrespective of a distance between a position of a recording layer, i.e., a light transmission layer and a recording layer targeted for information recording and reproduction.

FIGS. 6, 7A and 7B have illustrated an example when a recording layer is double-layered in order to simplify illustration, even an optical disk having a triple or more layered recording layer is also effective.

Now, a description will be given with respect to a method for detecting a distance between each of individual recording layers and the surface of a light transmission layer (distance from an arbitrary recording layer to the surface of the light transmission layer), i.e., thickness of the surface cover layer in an optical disk having a plurality of recording layers.

In the optical disk unit 401 shown in FIG. 6, consider that the objective lens 113 is moved in an optical axis direction by a lens holder (not shown), and the position of the objective lens 113 is controlled in a focusing direction.

For example, a drive current of a predetermined polarity and value is supplied from the objective lens control section 136 to the focus coil 120, and the objective lens 113 is moved along an optical axis (direction orthogonal to a planar direction of the substrate 2a of the optical disk 2), as shown in FIG. 8A, in a direction that approaches the optical disk 2.

At this time, as shown in FIG. 8C, as the objective lens 113 is more proximal to the substrate 2a of the optical disk 2, the focus difference signal is outputted as a zero crossing S-letter shape or a curve whose left and right is reversed relevant to a time axis on the surface of the light transmission layer 2c of the optical disk 2, i.e., at a position of a respective one of the second recording layer 2d (close to the light transmission layer) and the first recording layer 2b (close to the substrate 2a). Depending on the scale of a focus summation signal shown in FIG. 8B, it is possible to specify a position indicated by a zero cross, i.e., whether or not the zero cross is due to the surface of the light transmission layer 2c, the surface of the second recording layer 2d, or the surface of the first recording layer 2b.

If the optical disk 2 is inactive, the movement distance of the objective lens 113 can be associated with the scale of a drive current supplied to the focus coil 120.

Therefore, a distance between each recording layer and the surface of the light transmission layer can be detected by the scale of the drive current supplied to the focus coil 120 and an S-letter like curve (zero-cross) of a focus difference signal caused on the surface of the light transmission layer and at an arbitrary recording layer.

According to a distance from the surface of the light transmission layer 2c relevant to individual recording layers detected as described above, the position of the convex lens 119a of the relay lens 119 is controlled so as to offset a spherical aberration generated when the thickness error occurs with the light transmission layer 2, whereby the light quantity (light intensity) of the laser beam 11 emitted from the objective lens 113 and converged at the individual recording layers of the optical disk 2 can be constantly maintained. As has been described previously, a gain of a laser drive current supplied to the laser driver 132 is set in accordance with individual recording layers targeted for information recording or reproduction, whereby information can be constantly recorded and reproduced at a level that is generally equal to individual recording layers of an optical disk having a plurality of recording layers provided thereat.

In the above described embodiment, although a distance between the individual recording layers each and the surface of the light transmission layer has been detected before the optical disk 2 rotates (when the disk is inactive), if information concerning a distance between the individual recording layers each and the light transmission layer is recorded in an arbitrary region of the optical disk 2, information concerning a distance between the individual recording layers each and the surface of the light transmission layer is detected in an arbitrary region of the optical disk 2, information in distance between each of the recording layers recorded in the optical disk 2 in advance and the surface of the light transmission layer is read by a transmission layer information readout circuit (365) as described previously with reference to FIG. 5 at a time when the optical disk 2 is set to the optical disk unit 401. Then, the position in the optical axis direction of the convex lens 119a of the relay lens 119 can be set according to the read information. At this time, a distance between the individual recording layers each and the surface of the light transmission layer is recorded by a pre-pit or the like, for example, when the optical disk 2 is formed. A read-in-area or BCA region can be used as a recording region, as described previously. In addition, a distance between the individual recording layers each and the surface of the light transmission layer before the optical disk 2 rotates is detected in advance by using the previously described focus difference signal, and the distance information may be recorded in the above described recording region.

In this way, a distance between the individual recording layers each and the surface of the light transmission layer is recorded into the optical disk 2, thereby making it unnecessary to detect a distance between the individual recording layers each and the surface of the light transmission layer every time information recorded in the optical disk 2 is reproduced. In this manner, when the optical disk 2 is set to the optical disk unit, the startup time can be reduced until information recording and information reproduction has been enabled.

In addition, the position of the convex lens 119a of the relay lens 119 is controlled based on the above describe distance information, and a gain of the laser drive signal supplied to the laser driver 132 is controlled by a gain control circuit so that the light quantity of the laser beam 11 emitted from the object lens 113 and focused at an arbitrary recording layer of the optical disk 2 is set to a desired value, whereby information can be constantly recorded into and reproduced from individual recording layers of the optical disk having a plurality of recording layers provided thereat at a generally equal level.

Figure 9:
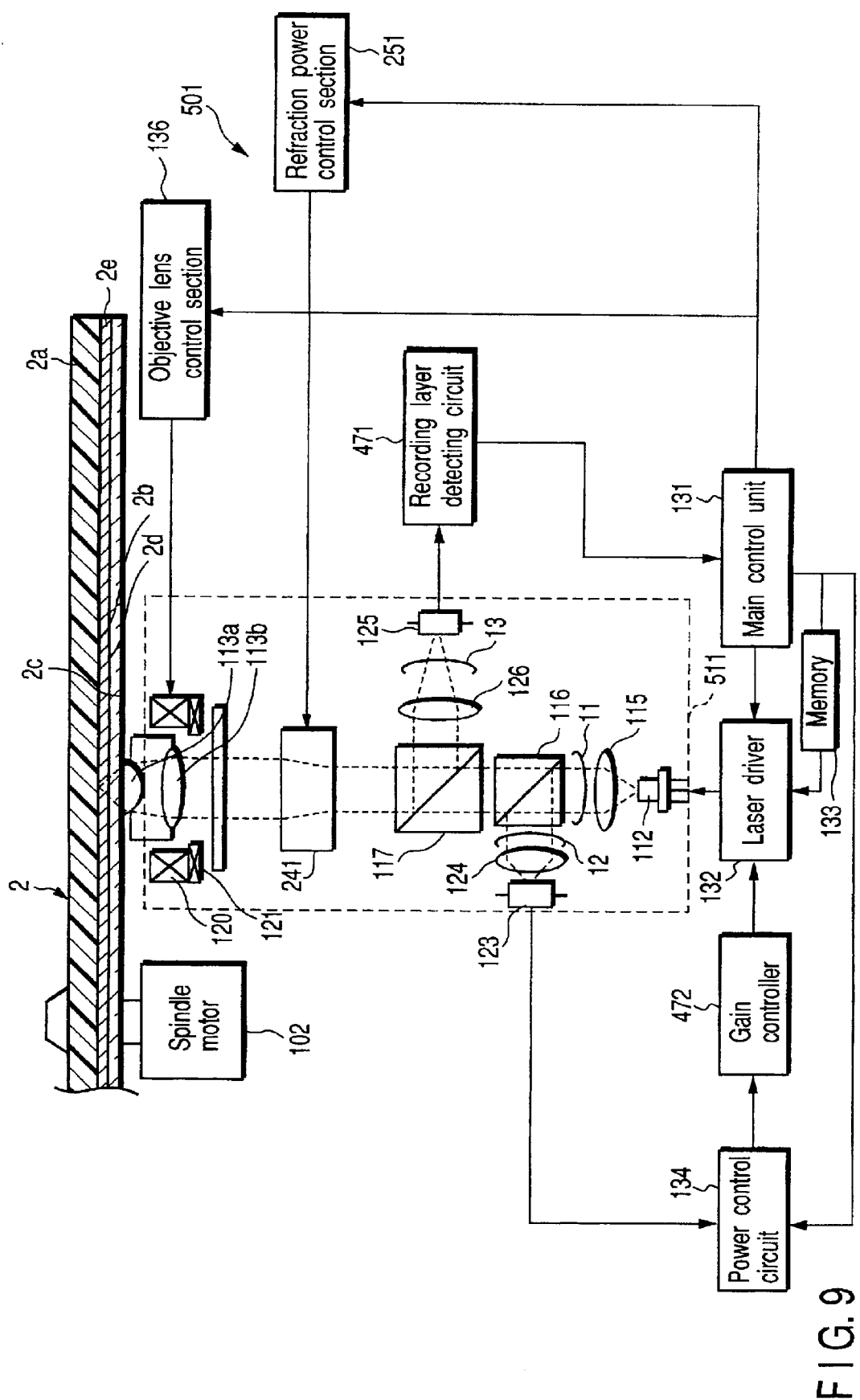
FIG. 9 is a schematic view illustrating still another embodiment of the optical disk unit shown in FIG. 1.

In addition, in FIG. 6, there has been illustrated an example of a method for correcting a change in light intensity of the laser beam caused by the thickness error of the light transmission layer 2c positioned between the recording layers 2b and 2d of the optical disk 2 and the laser unit 112, wherein the relay lens 119 consisting of the convex lens 119a and the concave lens 119b is used, thereby moving one of these lenses. However, in correcting a spherical aberration. IN the optical disk unit 501 shown in FIG. 9 includes an optical head 511, similar advantageous effect is obtained by using, an optical element capable of changing a refractive index by an external signal, for example, a liquid crystal element 241 of ECB type (refractive index changes depending on an applied voltage) and a refraction force control section 251 for changing a refractive index of the liquid crystal element 251. The optical head 511 shown in FIG. 9, the liquid crystal element 241 of ECB (electrically controlled birefringence) type is used instead of the relay lens 119 of the optical head device 411 and the position control coil 127 shown in FIG. 6, and the relay lens position control 135 is merely replaced with the refraction force control section 251, and thus, a detailed description of the other common configuration is omitted here.

As has been described above, in the optical head and optical disk unit according to the present invention, the intensity of light emitted from the objective lens can be constantly maintained using information contained in the light transmission layer of the optical disk irrespective of correction processing for a spherical aberration.

In addition, the information on the thickness of the light transmission layer can be used to detect a spherical aberration. Further, in an optical disk having a plurality of recording layers provided thereat, it is possible to correct a spherical aberration and correct light intensity according to a recording layer emitted with light beam for recording and reproduction, and it is possible to correct an effect of the spherical aberration that differs depending on each recording layer, thereby controlling the light intensity of light beam focused from the objective lens to the recording layer. In this manner, it is possible to record and reproduce information constantly relevant to some recording layers with different intervals between each of these recording layers and the optical transmission layer.

Furthermore, in an optical disk having a plurality of recording layers provided thereat, thereby controlling the light intensity of the light beam focused from the objective lens to the recording layer. This makes it possible to ensure stable information recording and reproduction relevant to some recording layers with different interval between each of these recording layers and the optical transmission layer.

Furthermore, in an optical disk having a plurality of recording layer, the light quantity of the light beam emitted with individual recording layers can be constantly controlled.

Still furthermore, a distance between the optical transmission layer and the individual recording layers each is recorded into an optical disk, whereby a different spherical aberration caused by a difference in distance to the recording layer can be corrected within a short period of time.

As has been described above, according to the present invention, in an optical disk unit and optical head unit capable of making recording operation at a high density with a thin surface cover layer of the optical disk while the number of apertures NA of the objective lens is increased, an effect of a spherical aberration caused by the thickness error of the surface cover layer, i.e., light transmission layer of the optical disk can be prevented, and thus, constant information recording and reproduction can be carried out. With respect to an optical disk having a plurality of recording layers as well, constant information recording and reproduction can be carried out similarly.

In addition, information on the thickness error of the surface cover layer is recorded in a predetermined recording region of the optical disk. Thus, when the optical disk is set to the optical disk unit, the recorded thickness information is read, whereby a startup time can be reduced. The thickness information is measure by segmenting it into a plurality of errors in the planar direction of the optical disk, and the information is recorded for each segment, whereby constant information recording and reproduction can be carried out without an effect of a fine error in thickness of the surface cover layer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk unit that emits light beams from an optical transmission layer, thereby recording information or reproducing information into or from an optical disk having a plurality of recording layers divided in a thickness direction and a light transmission layer protecting a recording layer positioned at an outermost side, said optical disk unit comprising:

a light source that emits a light beam used for recording information into an optical disk targeted for recording and reproducing information or for reproducing information from the optical disk;

an objective lens that transmits the light beam from said light source through the light transmission layer of the optical disk, thereby focusing light on the information recording layer of the optical disk;

a spherical aberration correction mechanism provided between said light source and said objective lens, the mechanism controlling a degree of a spherical aberration caused by the thickness error of the light transmission layer of the optical disk;

a spherical aberration correction mechanism control unit that controls an operation of said spherical aberration correction mechanism;

a light emission intensity control unit that controls intensity of the light beam emitted from said light source based on information of the light transmission layer recorded in the optical disk;

a gain adjustment that provides the predetermined gain is set according to the distance between the recording layer emitted for recording/reproduction and the light transmission layer into a control value inputted by said light emission intensity control unit:

an objective lens position moving device to move said objective lens in an optical axis direction;

a focus error signal generating section to generate a focus error signal according to a position at which there is formed a focusing spot on which a light beam is converged by predetermined focusing properties given by said objective lens and individual recording layers each;

a judgment section to judge whether or not the focus error signal is due to any information recording face of an optical disk or due to a surface of a light transmission layer; and a light transmission layer-recording layer distance detector device to detect a distance between said arbitrary information recording face and a surface of a light transmission layer of an optical disk while moving said objective lens in an optical axis direction.

2. An optical disk unit according to claim 1, wherein said light emission quantity control unit controls intensity of the light beam emitted from said light source according to a distance among a respective one of a plurality of recording layers of an optical disk, the light transmission layer, and a recording layer to be emitted with a light beam for recording or reproducing information.

3. An optical disk unit according to claim 1, further comprising:

a readout device to read out information contained in a predetermined position in the optical disk, the information contains a distance between an arbitrary recording layer of an optical disk and the light transmission layer.

* * * * *